(12) United States Patent
Kezuka et al.

(10) Patent No.: US 7,065,984 B2
(45) Date of Patent: Jun. 27, 2006

(54) SUBSTRATE FOR INFORMATION RECORDING MEDIA AND MANUFACTURING METHOD THEREOF, INFORMATION RECORDING MEDIUM, AND STARTING MATERIAL GLASS PLATE

(75) Inventors: Masamichi Kezuka, Osaka (JP); Koji Okuhata, Osaka (JP); Kensuki Matsuno, Osaka (JP); Takeo Watanabe, Osaka (JP)

(73) Assignees: Nippon Sheet Glass Co., Ltd., Osaka (JP); Hoya Corporation, Tokyo (JP)

( * ) Notice: Subject to any disclaimer, the term of this patent is extended or adjusted under 35 U.S.C. 154(b) by 323 days.

(21) Appl. No.: 10/300,383

(22) Filed: Nov. 20, 2002

(65) Prior Publication Data

US 2003/0121285 A1  Jul. 3, 2003

Related U.S. Application Data

(63) Continuation of application No. PCT/JP01/02500, filed on Mar. 27, 2001.

(51) Int. Cl.
*C03B 18/02*   (2006.01)
*C03C 19/00*   (2006.01)

(52) U.S. Cl. .............. 65/61; 65/99.2; 451/41; 451/42; 451/57

(58) Field of Classification Search ............ 65/61, 65/99.2; 451/41, 42, 57
See application file for complete search history.

(56) References Cited

U.S. PATENT DOCUMENTS

| | | | | |
|---|---|---|---|---|
| 4,994,139 A | * | 2/1991 | Biermann et al. | 438/27 |
| 5,868,953 A | * | 2/1999 | Maekawa et al. | 216/89 |
| 6,094,942 A | | 8/2000 | Falleroni | |
| 6,532,770 B1 | * | 3/2003 | Uhlik et al. | 65/97 |
| 6,537,648 B1 | * | 3/2003 | Takahashi et al. | 428/141 |
| 2001/0049031 A1 | | 12/2001 | Bajorek et al. | |

FOREIGN PATENT DOCUMENTS

| | | | |
|---|---|---|---|
| EP | 1033351 A1 | * | 9/2000 |
| JP | 60-159531 U | | 10/1985 |
| JP | 8-147688 A | | 6/1996 |
| JP | 2000-348332 A | | 12/2000 |
| JP | 2000-351653 A | | 12/2000 |

* cited by examiner

*Primary Examiner*—Sean Vincent
(74) *Attorney, Agent, or Firm*—Frishauf, Holtz, Goodman & Chick, P.C.

(57) ABSTRACT

A substrate for use as a disk substrate in a hard disk drive or the like, an information recording medium such as a magnetic disk, and a starting material glass plate which is a starting material of the substrate for information recording media. The forming conditions of the starting material glass plate are controlled such that the starting material glass plate has a long-wavelength waviness of not more than 6 nm. This starting material glass plate is polished so as to have a long-wavelength waviness of not more than 6 nm using $CeO_2$ abrasive grains having a mean grain diameter of not less than 0.01 μm and a 90% diameter of the volume grain size distribution of not less than 0.02 μm. The resulting substrate for an information recording medium has an excellent planarity, can be obtained in a short time and with a low polishing amount, and the resulting information recording medium is able to cope with increased data zone recording density.

24 Claims, 8 Drawing Sheets

GLASS MATERIAL POWDER

SUBSTRATE FOR INFORMATION RECORDING MEDIA AND MANUFACTURING METHOD THEREOF, INFORMATION RECORDING MEDIUM, AND STARTING MATERIAL GLASS PLATE

This application is a Continuation Application under 35 USC 371 of International Application PCT/JP01/02500 filed Mar. 27, 2001, the entire contents of which are incorporated herein by reference.

TECHNICAL FIELD

The present invention relates to a substrate for information recording media and a manufacturing method thereof, an information recording medium, and a starting material glass plate, and more specifically to a substrate for information recording media for use as a disk substrate in a hard disk drive or the like and a manufacturing method thereof, an information recording medium such as a magnetic disk, an optical magnetic disk or an optical disk, and a starting material glass plate for use as a starting material of the substrate for information recording media.

BACKGROUND ART

In recent years, there has been remarkable progress in information technology, and development of various types of information recording medium for storing information such as magnetic disks, optical magnetic disks and optical disks has been carried out with vigor.

Of these types of information recording medium, in the case for example of a magnetic disk, a magnetic film is formed on at least one surface of a donut-shaped magnetic disk substrate, and recording and playback of information are carried out by a magnetic head sliding over a data zone thus formed on the magnetic disk substrate.

As a method of manufacturing such a magnetic disk substrate, a method has been proposed in which a thin film of a magnetic material is formed directly on at least one surface of a sheet-shaped starting material glass plate that has been manufactured by a float process or the like, without polishing the starting material glass plate (see, for example, Japanese Laid-open Utility Model Publication (Kokai) No. 60-159531).

However, with this manufacturing method, it is difficult to manufacture a magnetic disk having a good planarity sufficient to cope with increases in data zone recording density that have occurred in recent years. At present it is thus still common to polish the starting material glass plate when manufacturing a magnetic disk substrate.

FIG. 1 is a flowchart showing a conventional method of manufacturing such a magnetic disk substrate.

In this conventional method, a starting material glass plate 101 is cut into a donut shape in a disk processing step 102, then the inner and outer peripheral surfaces of the starting material glass plate 101 are processed to predetermined dimensions in an edge processing step 103, then the main surfaces of the starting material glass plate 101 are polished in a surface polishing step 104, then the substrate is strengthened if necessary in a chemical strengthening treatment step 105, and then a finishing washing step 106 is carried out, thus completing the manufacture of the magnetic disk substrate 107.

In the surface polishing step 104, the polishing of the surfaces of the starting material glass plate 101 is carried out in three stages, i.e. rough polishing 104a, pre-polishing 104b, and precision polishing 104c.

The surfaces of the magnetic disk substrate 107 manufactured from the sheet-shaped starting material glass plate 101 have an undulating shape on a microscopic scale, in which a plurality of types of surface waviness classified by wavelength band are superimposed on one another, for example, long-wavelength waviness 108, medium-wavelength waviness 109 and short-wavelength waviness 110, as shown in FIG. 2. A magnetic head 111 flies over the magnetic disk substrate 107 having this surface waviness.

However, as the data zone recording density has been increased in recent years, the surface waviness properties have come to exert a large influence on the electromagnetic conversion properties. If the ability of the magnetic head to follow the surface waviness is poor, then there will be a risk of malfunction during recording and/or playback, and hence a very high degree of planarity has come to be demanded of magnetic disk substrates.

The surface polishing step 104 is thus conventionally divided into three stages as described above. First, rough polishing 104a using abrasive grains having a relatively large mean diameter is carried out. As a result, the thickness of the starting material glass plate 101 is adjusted to a predetermined value, and moreover surface waviness, in particular long-wavelength waviness, is reduced, thus correcting the degree of flatness of the starting material glass plate 101. Then, in the pre-polishing 104b and precision polishing 104c, minute flaws formed on the surface of the starting material glass plate 101 and surface waviness of relatively short wavelength (medium- and short-wavelength waviness) are removed.

In recent years, to cope with increases in data zone recording density, there has been vigorous development of technology to reduce the size of the magnetic head 111, set the flying height of this small magnetic head 111 to be low, and make the magnetic head 111 fly stably over the magnetic disk substrate 107 at this low flying height. Nowadays, the length of magnetic heads has been reduced from about 2 mm to 1 mm or less.

As shown in FIG. 3, the long-wavelength waviness 108 is a relatively gently sloping waviness, and hence it is possible for the magnetic head 111 to fly over the magnetic disk substrate 107 while following the long-wavelength waviness 108 and thus maintaining a constant minute gap t between the magnetic head 111 and the magnetic disk substrate 107.

In contrast, as shown in FIG. 4, the medium-wavelength waviness 109 and the short-wavelength waviness 110 have steep sloping parts 112, and hence the magnetic head 111 cannot fly over the magnetic disk substrate 107 while maintaining a constant minute gap t between the magnetic head 111 and the magnetic disk substrate 107 as is possible with the long-wavelength waviness 108, i.e. the magnetic head 111 cannot follow the medium-wavelength waviness 109 and the short-wavelength waviness 110. If medium-wavelength waviness 109 and short-wavelength waviness 110 are present on the substrate surface, then this may thus cause malfunction during recording and/or playback. To obtain a magnetic disk substrate of a desired high quality sufficient for coping with increased data zone recording density, it is thus necessary to carry out surface polishing so that medium-wavelength waviness 109 and short-wavelength waviness 110 are removed.

However, in the conventional manufacturing method described above, although in the rough polishing 104a it is possible to correct the degree of flatness, a lack of which is caused by long-wavelength waviness 108, new mediumwavelength waviness 109 and short-wavelength waviness 110 are formed on the surfaces of the starting material glass plate 101 through this rough polishing 104a, and hence it is necessary to increase the polishing amount in the pre-polishing 104b and the precision polishing 104c. In the conventional manufacturing method, there is thus a problem that it is necessary to initially make the starting material glass plate 101 thicker by a certain predetermined amount, and moreover a large amount of polishing waste is discharged during the polishing, resulting in an increase in the amount of industrial waste, and an increase in the manufacturing cost.

Furthermore, the abrasive grains used in the rough polishing 104a have a larger diameter than the abrasive grains used in the pre-polishing 104b and the precision polishing 104c, and hence the surfaces of the starting material glass plate 101 are easily scratched, and the amount of subsequent polishing must be increased to remove these surface scratches; there is thus a problem that the starting material glass plate 101 must initially be made thicker by a certain predetermined amount for this reason as well.

Moreover, because the rough polishing 104a using abrasive grains having a large diameter is carried out after the inner and outer peripheral surfaces of the starting material glass plate 101 have been ground and polished in the edge processing step 103, even if the inner and outer peripheral surfaces have been mirror-finished at considerable effort in the edge processing step 103, they are polished once again with coarse abrasive grains during the rough polishing 104a, and hence there is a problem that the surface roughness of the inner and outer peripheral surfaces drops, resulting in a drop in product quality.

Furthermore, because the surface polishing step 104 is carried out in three divided stages (the rough polishing 104a, the pre-polishing 104b and the precision polishing 104c) as described above, there is a problem that the number of steps required in the surface polishing is high and hence it takes a long time to complete the manufacturing, and moreover there is a risk of the surfaces of the starting material glass plates 101 being scratched due to the substrates contacting one another or the jig or the like in each of the steps, and thus productivity is poor.

DISCLOSURE OF THE INVENTION

In view of the problems described above, it is an object of the present invention to provide a substrate for information recording media having surfaces with a very high degree of planarity, and having a high product quality and a high reliability.

Moreover, it is another object of the present invention to provide a method of manufacturing the above substrate for information recording media, which enables the substrate for information recording media to be manufactured easily in a short time and with a low polishing amount, and which thus enables productivity to be increased.

Furthermore, other objects of the present invention are to provide an information recording medium capable of coping with a high recording density by using the above substrate for information recording media, and to provide a starting material glass plate suitable for manufacturing the substrate for information recording media.

The present invention will now be disclosed in outline form.

With information recording media such as magnetic disks nowadays, because magnetic heads have been reduced in size, it has become possible for a magnetic head to follow long-wavelength waviness, as described in the section "Background Art" above (see FIG. 3). It is thus thought that the stage has been reached at which the necessity of the rough polishing step in which medium-wavelength waviness and short-wavelength waviness are newly produced should be investigated.

Regarding this point, it has already been proposed to manufacture a glass substrate for magnetic media (i.e. a substrate for information recording media) without carrying out lapping, which is rough polishing (Japanese Laid-open Patent Publication (Kokai) No. 2000-351653; hereinafter referred to as "the prior art").

However, to cope with increases in data zone recording density, the surfaces of the glass substrate must have an extremely high degree of planarity, and hence surface polishing must be carried out in some form.

However, in the above prior art, although the point "manufacture a substrate for information recording media without carrying out rough polishing (lapping)" is disclosed, there are no specific disclosures whatsoever concerning what technical means can be used to secure a high degree of planarity.

With regard to surface waviness formed on glass surfaces, defining the long-wavelength waviness to be the average waviness Wa measured in a wavelength band of 0.4 mm to 5.0 mm using an Optiflat optical-type surface waviness measuring instrument made by Phase Shift Technology, the mediumwavelength waviness to be the average waviness Wa measured in a wavelength band of 0.4 mm to 2.0 mm using the above Optiflat measuring instrument, and the short-wavelength waviness to be the average roughness Ra measured in a wavelength band of 0.2 mm to 1.4 mm using a Newview 200 optical-type surface roughness meter made by Zygo, the present inventors thus carried out assiduous studies, and as a result discovered that if the surface waviness of the starting material glass plate is good, then a substrate for information recording media having an extremely good planarity can be obtained easily in a short time and with a low polishing amount by carrying out only precision polishing using ultra-fine abrasive grains of a certain predetermined diameter and without carrying out rough polishing.

Based on this discovery, a method of manufacturing a substrate for information recording media according to the present invention comprises the step of carrying out surface polishing on at least one surface of a sheet-shaped starting material glass plate, wherein the surface polishing comprises only precision polishing using ultra-fine abrasive grains having a first predetermined grain diameter.

According to the above method, the surface polishing is carried out using only ultra-fine abrasive grains having a first predetermined grain diameter. As a result, there is no longer any new production of medium-wavelength waviness and/or short-wavelength waviness due to rough polishing, and hence a high-quality substrate for information recording media having an excellent planarity can be manufactured easily in a short time and with a low polishing amount. Moreover, because the polishing amount is low, the discharge of industrial waste such as polishing waste can be suppressed, which is good environmentally.

Moreover, from the results of further experiments, the present inventors discovered that by carrying out pre-polishing using fine abrasive grains having a second predetermined grain diameter larger than the first predetermined grain diameter before carrying out the precision polishing, a desired substrate for information recording media can be obtained in a yet shorter time without new medium-wavelength waviness and/or short-wavelength waviness arising.

The method of manufacturing a substrate for information recording media according to the present invention thus alternatively comprises the step of carrying out surface polishing on at least one surface of a sheet-shaped starting material glass plate, wherein the surface polishing comprises only pre-polishing and precision polishing, wherein the precision polishing is carried out using ultra-fine abrasive grains having a first predetermined grain diameter, and the pre-polishing is carried out using fine abrasive grains having a second predetermined grain diameter larger than the first predetermined grain diameter.

Moreover, to avoid minute flaws from being formed on the surface(s) of the starting material glass plate, but also avoid dropping of the polishing rate, the first predetermined grain diameter is preferably such that the mean grain diameter is in a range of 0.01 µm to 1.3 µm, and the 90% diameter of the volume grain size distribution (hereinafter referred to merely as the "90% diameter") is in a range of 0.02 µm to 3.5 µm.

Furthermore, when the pre-polishing is carried out, from the viewpoint of avoiding the formation of minute flaws and short-wavelength waviness on the substrate for information recording media, it is preferable for the second predetermined grain diameter to be such that the mean grain diameter is in a range of 0.3 µm to 5 µm, and the 90% diameter is in a range of 1 µm to 15 µm.

It should be noted that in the present invention, the "mean grain diameter" is the grain diameter at which the integrated volume grain size becomes 50% of the entire integrated volume grainsize in the volume grain size distribution when integration of the grain diameter is carried out in order from the smallest grain diameter for the volume grain size distribution, and the "90% diameter" is the grain diameter at which integrated volume grain size becomes 90% of the entire integrated volume grain size in the volume grain size distribution when integration of the grain diameter is carried out in order from the smallest grain diameter for the volume grain size distribution.

Moreover, the present inventors carried out further assiduous studies, and as a result discovered that, when manufacturing the sheet-shaped starting material glass plate, by suitably controlling the forming conditions thereof, the long-wavelength waviness can be reliably kept down to not more than 6 nm, and moreover that by carrying out surface polishing as described above on such a starting material glass plate having a long-wavelength waviness of not more than 6 nm, a substrate for information recording media having extremely good surface waviness properties and an excellent planarity can easily be obtained.

In the method of manufacturing a substrate for information recording media according to the present invention, it is thus preferable to use a starting material glass plate having a plurality of types of surface waviness classified by wavelength band formed in a fashion superimposed on one another on at least one surface of the starting material glass plate, wherein the long-wavelength waviness for which the wavelength band is highest out of these types of surface waviness is formed to not more than 6 nm.

Moreover, considering productivity, it is preferable for the long-wavelength waviness of the starting material glass plate to be formed to not less than 0.4 nm. In addition, to carry out the precision polishing efficiently, it is preferable for the starting material glass plate to be formed such that the short-wavelength waviness for which the wavelength band is lowest is in a range of 0.1 nm to 0.7 nm, and the medium-wavelength waviness for which the wavelength band is intermediate between the wavelength band of the long-wavelength waviness and the wavelength band of the short-wavelength waviness is in a range of 0.25 nm to 2 nm.

Furthermore, considering productivity and the like, it is preferable to use a float process as the method of manufacturing the starting material glass plate having the long-wavelength waviness kept down to not more than 6 nm. It is thus preferable to manufacture the starting material glass plate from a glass ribbon in a predetermined high temperature state formed by pouring a glass raw material onto molten tin.

Moreover, to remove minute flaws from the at least one surface of the starting material glass plate during the polishing while making the polishing time as short as possible, it is preferable for the polishing amount in the surface polishing to be in a range of 1 µm to 75 µm, more preferably 1 µm to 25 µm, from the at least one surface of the starting material glass plate.

Furthermore, to carry out the precision polishing while maintaining a good polishing rate but without damaging the starting material glass plate, it is preferable to use at least one material selected from the group consisting of cerium oxide, aluminum oxide, zirconium oxide, silicon oxide and manganese oxide as the ultra-fine abrasive grains used in the surface polishing; it is particularly preferable to use cerium oxide.

Moreover, a substrate for information recording media according to the present invention is characterized by being manufactured by any of the manufacturing methods as described above, wherein a plurality of types of surface waviness classified by wavelength band are formed in a fashion superimposed on one another on at least one surface of the starting material glass plate. Moreover, preferably, the long-wavelength waviness for which the wavelength band is highest is formed to 0.3 nm to 1.2 nm, the short-wavelength waviness for which the wavelength band is lowest is formed to 0.1 nm to 0.6 nm, and the medium-wavelength waviness for which the wavelength band is intermediate between the wavelength band of the long-wavelength waviness and the wavelength band of the short-wavelength waviness is formed to 0.2 nm to 0.9 nm.

According to the above constitution, a substrate for information recording media having good surface waviness properties and an excellent planarity can be obtained easily and in a short time.

Moreover, an information recording medium according to the present invention comprises a substrate for information recording media as described above, and an information recording layer formed on at least one surface of the substrate.

According to the above constitution, an information recording medium having an excellent planarity and thus capable of coping with increased data zone recording density can be obtained easily.

Moreover, a starting material glass plate according to the present invention, which has a plurality of types of surface waviness classified by wavelength band formed in a fashion superimposed on one another on at least one surface thereof, is characterized in that the long-wavelength waviness for which the wavelength band is highest is formed to not more than 6 nm. Moreover, preferably, the short-wavelength waviness for which the wavelength band is lowest is formed to not more than 0.7 nm, and the medium-wavelength waviness for which the wavelength band is intermediate between the wavelength band of the long-wavelength waviness and the wavelength band of the short-wavelength waviness is formed to not more than 2 nm. Moreover, preferably, the starting material glass plate is manufactured from a glass ribbon in a predetermined high temperature state formed by pouring a glass raw material onto molten tin.

According to the above constitution, a starting material glass plate having the long-wavelength waviness suppressed can easily be obtained by a float process, and hence a starting material glass plate suitable for manufacturing a substrate for information recording media can be provided.

BEST MODES FOR CARRYING OUT THE INVENTION

A detailed description will now be given of best modes for carrying out the present invention, with reference to the drawings.

Figure 1:
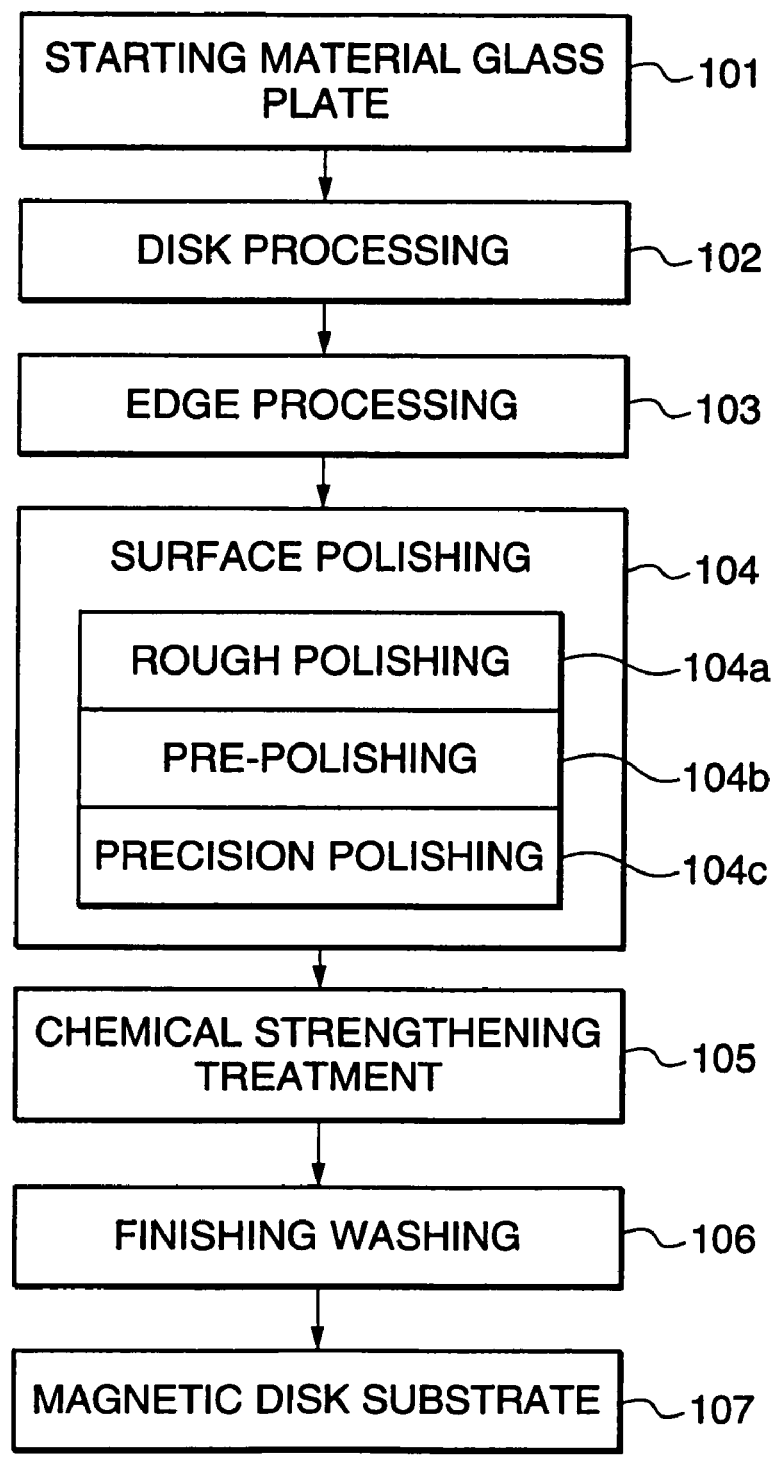
FIG. 1 is a flowchart showing a conventional method of manufacturing a substrate for information recording media.
Figure 2:
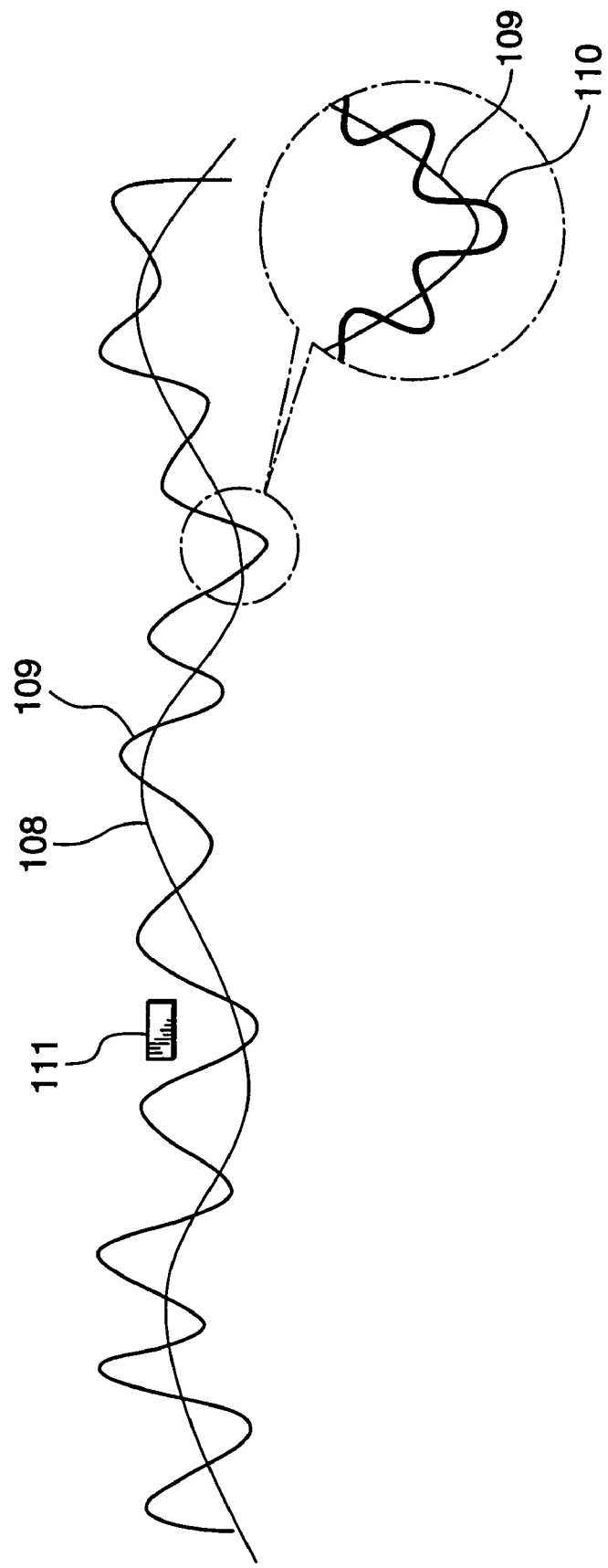
FIG. 2 is a schematic view showing a state of surface waviness on a conventional starting material glass plate.
Figure 3:
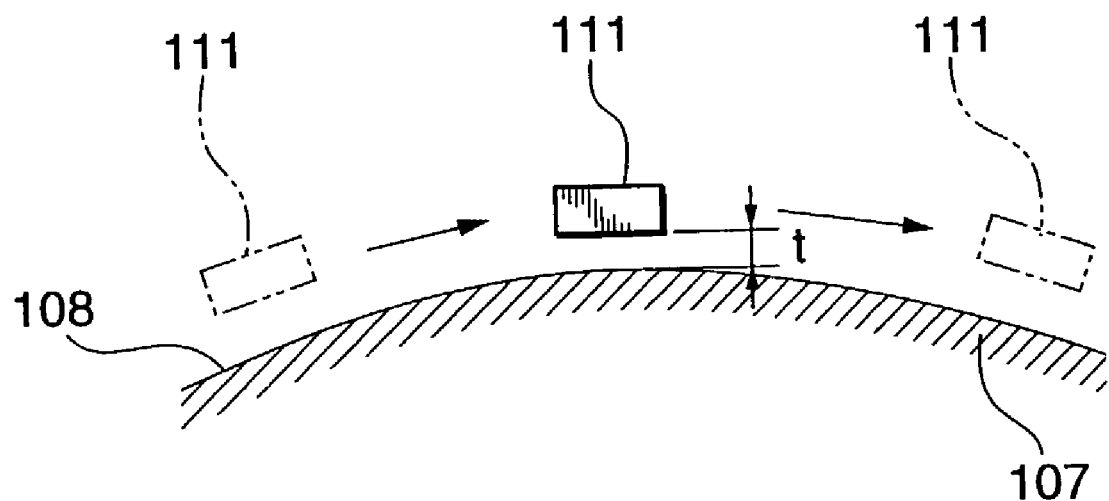
FIG. 3 is a schematic view useful in explaining the relationship between a magnetic head and a magnetic disk substrate in the case of long-wavelength waviness.
Figure 4:
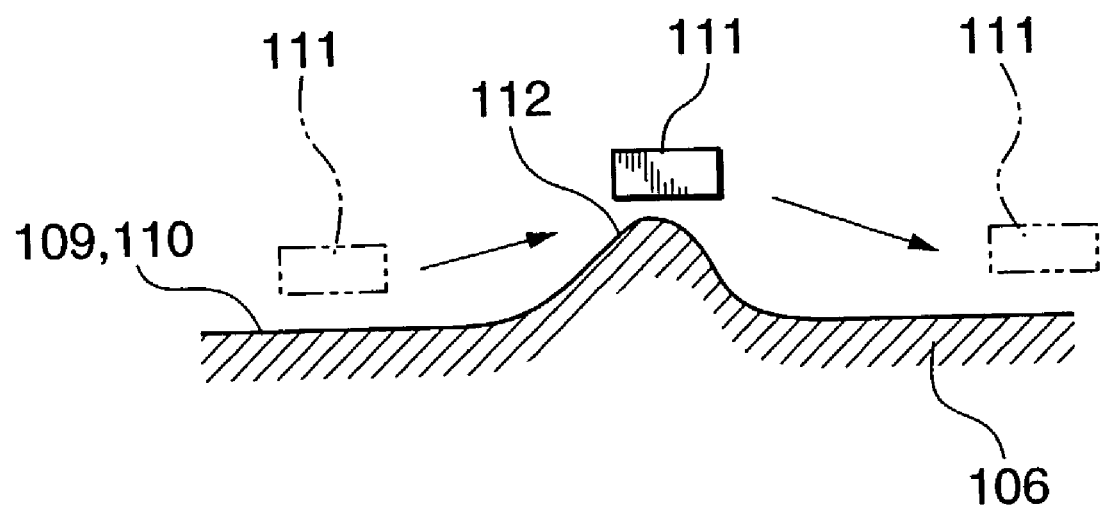
FIG. 4 is a schematic view useful in explaining the relationship between a magnetic head and a magnetic disk substrate in the case of medium-wavelength waviness or short-wavelength waviness.
Figure 5:
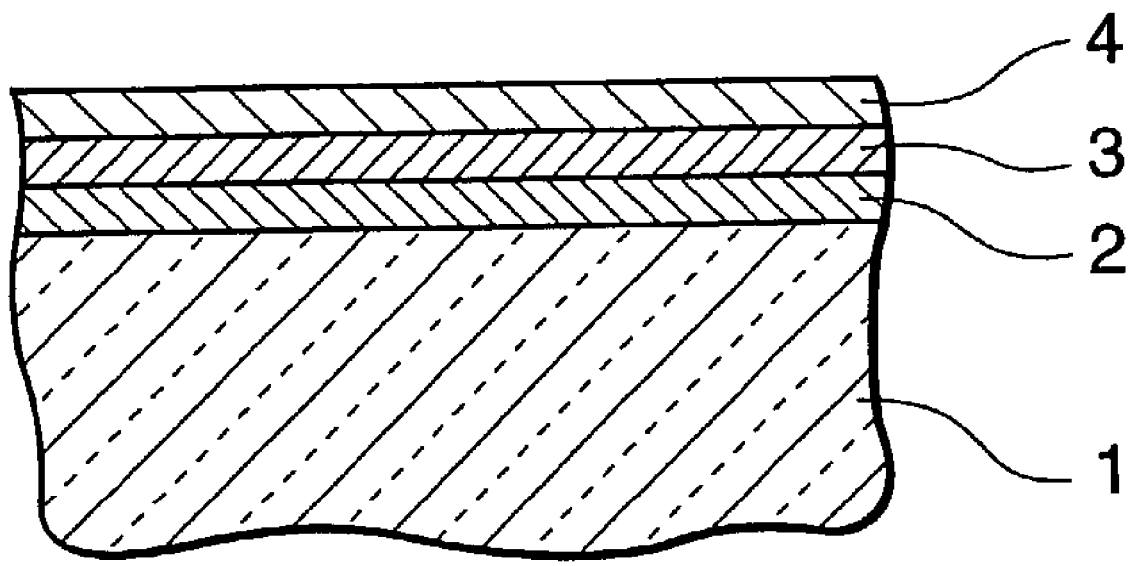
FIG. 5 is a schematic sectional view showing principal parts of an information recording medium according to an embodiment of the present invention.

FIG. 5 is a schematic sectional view showing an information recording medium, specifically a magnetic disk, according to an embodiment of the present invention. The magnetic disk is comprised of a magnetic disk substrate 1 having a foundation layer 2, a magnetic layer 3 and a protective layer 4 formed in this order on a surface thereof using a known sputtering method.

The magnetic disk substrate 1 is manufactured by a manufacturing method described below, and minute surface waviness is formed on the substrate surface. Specifically, the surface waviness is classified into the three types defined in the "Disclosure of the Invention" section above (long-wavelength waviness, medium-wavelength waviness and short-wavelength waviness), and the magnetic disk substrate 1 is formed such that the long-wavelength waviness becomes 0.3 nm to 1.2 nm, the medium-wavelength waviness becomes 0.2 nm to 0.9 nm, and the short-wavelength waviness becomes 0.1 nm to 0.6 nm.

The reasons for setting the long-wavelength waviness, the medium-wavelength waviness and the short-wavelength waviness of the magnetic disk substrate 1 to be in the above ranges will now be stated.

If the long-wavelength waviness exceeds 1.2 nm, and/or the medium-wavelength waviness exceeds 0.9 nm, and/or the short-wavelength waviness exceeds 0.6 nm, then the overall surface waviness will become large, resulting in it being difficult for a magnetic head to follow the surface waviness when flying at a low flying height over the magnetic disk substrate 1, which nowadays is made to have a high recording density, and hence in it not being possible to obtain a high-quality magnetic disk substrate 1. On the other hand, even if the long-wavelength waviness is made to be less than 0.3 nm, and/or the medium-wavelength waviness is made to be less than 0.2 nm, and/or the short-wavelength waviness is made to be less than 0.1 nm, no further improvement will be expected in the product quality, which will already have peaked. In the present embodiment, the magnetic disk substrate 1 is thus manufactured such that the long-wavelength waviness becomes 0.3 nm to 1.2 nm, the medium-wavelength waviness 0.2 nm to 0.9 nm, and the short-wavelength waviness 0.1 nm to 0.6 nm.

It should be noted that because the three types of surface waviness classified by wavelength band are formed in a fashion superimposed on one another on the surface of the magnetic disk substrate 1, if even one type of surface waviness out of the three types exceeds the range stated above, then the electromagnetic conversion properties of the magnetic head will worsen, and hence the product quality of the magnetic disk substrate 1 will drop. It is thus necessary for the ranges for all three types of surface waviness to be satisfied.

Moreover, in the magnetic disk, CrMo, Cr, CrV or the like can be used as the material of the foundation layer 2, and a cobalt alloy such as CoPtCr or CoPtCrTa that enables excellent information recording/playback characteristics and film adhesion to be secured can be used as the material of the magnetic layer 3. A carbon material such as hydrogenated carbon can be used as the material of the protective layer 4.

The method of manufacturing the magnetic disk substrate 1 will now be described in detail.

Figure 6:
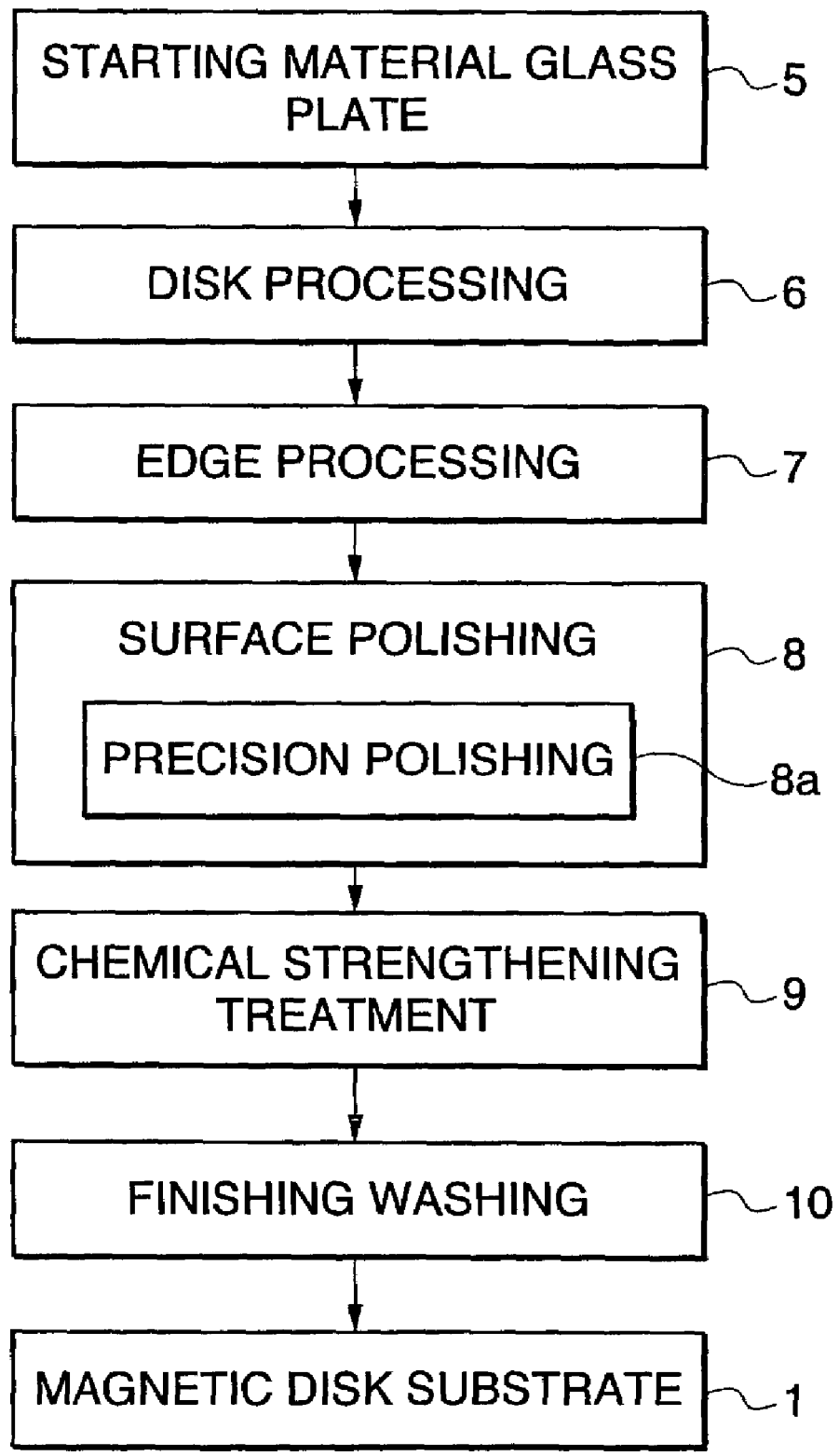
FIG. 6 is a flowchart showing a method of manufacturing a substrate for information recording media according to an embodiment of the present invention.

FIG. 6 is a flowchart showing the method of manufacturing the magnetic disk substrate 1 according to a first embodiment of the present invention. Taking, for example, a piece of float plate glass manufactured by a float process as the starting material glass plate 5, the magnetic disk substrate 1 is manufactured through a disk processing step 6, an edge processing step 7, a surface polishing step 8, a chemical strengthening treatment step 9 and a finishing washing step 10 carried out in this order.

Figure 7:
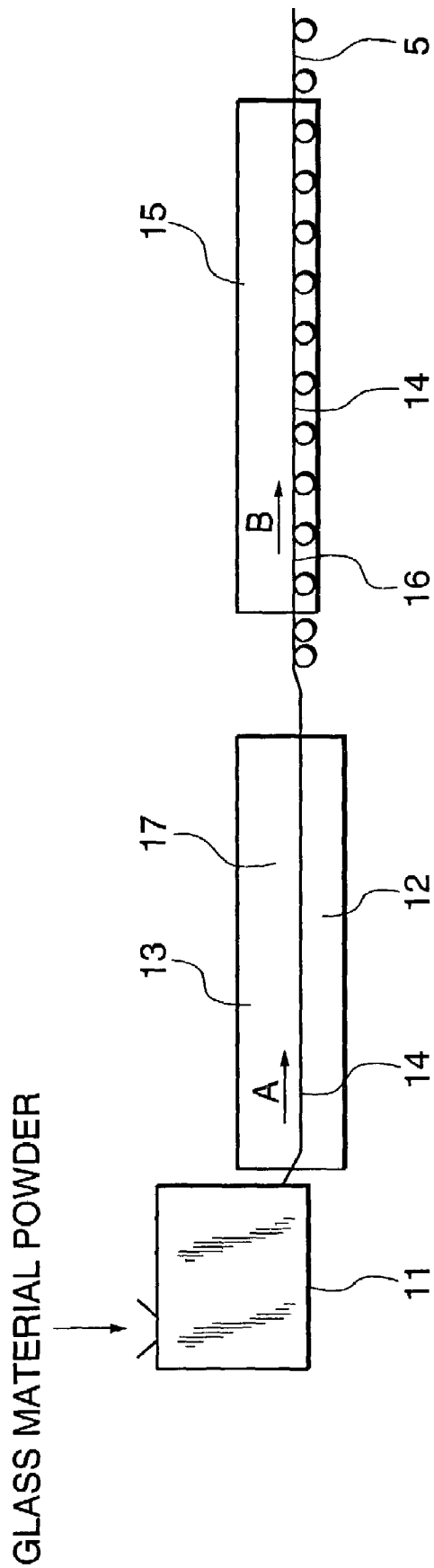
FIG. 7 is a schematic view showing the construction of a float plate glass manufacturing apparatus.

FIG. 7 is a schematic structural view showing a float plate glass manufacturing apparatus. The float plate glass manufacturing apparatus has as principal parts thereof a melting furnace 11 into which a predetermined glass material powder is charged and in which the glass material powder is melted under a predetermined high-temperature atmosphere, a hermetically sealed forming bath 13 that is placed under a reducing atmosphere and contains molten tin 12, and an annealing furnace 15 in which a glass ribbon 14 drawn from the forming bath 13 is annealed.

There are no particular limitations on the glass materials. For example, a soda lime glass having $SiO_2$, $Na_2O$ and $CaO$ as principal components thereof, an aluminosilicate glass having $SiO_2$, $Al_2O_3$, $Na_2O$ and $Li_2O$ as principal components thereof, a borosilicate glass, an $Li_2O$-$SiO_2$ glass, an $Li_2O$—$Al_2O_3$—$SiO_2$ glass, or an RO—$Al_2O_3$—$SiO_2$ glass (wherein R=Mg, Ca, Sr or Ba) can be used. Moreover, a glass for glass strengthening in which $ZrO_2$, $TiO_2$ or the like has been added to glass materials as above, or a crystallized glass that is not subjected to chemical strengthening, can be used.

In the float plate glass manufacturing apparatus described above, the glass material powder, which has been prepared to a predetermined composition, is charged into the melting furnace 11, which has been heated to 1500 to 1600° C., whereupon the glass material powder is melted in the melting furnace 11 to form a molten glass, which then flows into the forming bath 13. As described above, the forming bath 13 contains molten tin 12. The molten glass has a lower specific gravity than the molten tin 12, and hence floats on top of the molten tin 12, moving in the direction of the arrow A in FIG. 7. As a result of floating on top of the molten tin 12, the molten glass is formed into a ribbon shape, and hence becomes a glass ribbon 14 having a predetermined thickness.

The glass ribbon 14 thus produced is drawn into the annealing furnace 15 via a roller conveyor 16, and is conveyed in the direction of the arrow B shown in FIG. 7. The glass ribbon 14 is then cooled down to room temperature in the annealing furnace 15, this being done in such a way as to prevent warping from occurring. The glass ribbon 14 that has been cooled to room temperature is then discharged from the annealing furnace 15, and is cut into rectangular shapes, thus manufacturing a large number of starting material glass plates 5 from a single manufacturing lot.

In the float plate glass manufacturing apparatus described above, the lower surface of the glass ribbon 14 in contact with the molten tin 12 is cooled while in contact with the molten tin 12, which has a free surface, and hence the lower surface of the glass ribbon 14 is expected to be extremely flat on a macroscopic scale. Moreover, as the glass ribbon 14 is formed into a sheet shape of the predetermined thickness, the upper surface of the glass ribbon 14, which is in contact with a space 17 above the molten tin 12, spreads out in a horizontal direction through viscous flow; the upper surface of the glass ribbon 14 should thus also be extremely flat on a macroscopic scale.

However, the molten tin 12 does not have a constant temperature throughout, but rather there is a temperature gradient in the direction of the arrow A shown in FIG. 7, and also the temperature is not uniform in the width direction of the glass ribbon 14 (the direction perpendicular to the plane of the paper in FIG. 7). Furthermore, the temperature is also not constant throughout the space 17. As a result, even though the upper and lower surfaces of the glass ribbon 14 may have excellent planarity on a macroscopic scale, in general on a microscopic scale there will be quite a large surface waviness. Even if precision polishing described below is carried out on a starting material glass plate 5 having such a large surface waviness, then it will not be possible to reduce the surface waviness to the desired value in a short time and with a low polishing amount. Moreover, if such a large surface waviness is to be removed, then it will be necessary to initially make the starting material glass plate 5 extra thick.

In the present embodiment, by suitably controlling the temperature inside the forming bath 13 and controlling the forming conditions, the starting material glass plate 5 is thus formed in such a way that the surface waviness of the starting material glass plate 5, in particular the long-wavelength waviness, becomes small.

Specifically, by suitably controlling the temperature gradient in the direction of the arrow A in FIG. 7 of the molten tin 12 in contact with the glass ribbon 14, and carrying out temperature control such that the temperature variation of the molten tin 12 in the width direction of the glass ribbon 14 is as small as possible, and moreover controlling convection that occurs within the molten tin 12, and furthermore controlling the forming conditions such that the temperature variation and convection turbulence in the space 17 above the molten tin 12 become small, a starting material glass plate 5 having the desired surface waviness properties can be manufactured. In particular, as the glass ribbon 14 moves in the direction of the arrow A in FIG. 7, the viscosity of the glass increases, and hence to obtain the desired surface waviness properties, it is preferable for the temperature distribution in the width direction of the glass ribbon 14 to be made as uniform as possible near to the exit of the forming bath 13, and to stop small vibrations from the outside from getting into the molten tin 12.

Specifically, it is preferable to form the starting material glass plate 5 such that the long-wavelength waviness is 0.4 nm to 6 nm, the medium-wavelength waviness 0.25 nm to 2 nm, and the short-wavelength waviness 0.1 nm to 0.7 nm.

The reason for this is that if the long-wavelength waviness exceeds 6 nm and/or the medium-wavelength waviness exceeds 2 nm and/or the short-wavelength waviness exceeds 0.7 nm, then to obtain a magnetic disk substrate 1 having the desired good planarity, it will be necessary to make the polishing amount large when carrying out the precision polishing in the surface polishing described below, and moreover the polishing time will become long. On the other hand, it would be difficult in terms of production technology to control the various forming conditions such that the long-wavelength waviness is less than 0.4 nm, the medium-wavelength waviness is less than 0.25 nm and the short-wavelength waviness is less than 0.1 nm, and the production cost would rise.

In the present embodiment, the forming conditions are thus controlled when manufacturing the starting material glass plate 5 such that the long-wavelength waviness becomes 0.4 nm to 6 nm, the medium-wavelength waviness 0.25 nm to 2 nm, and the short-wavelength waviness 0.1 nm to 0.7 nm.

Subsequently, the starting material glass plate 5 having surface waviness properties as described above is subjected to various types of processing, and the magnetic disk substrate 1 is manufactured as a product through the various steps mentioned above.

A description will now be given of these manufacturing steps in the order in which they are carried out.

(1) Disk Processing Step 6

In the disk processing step 6, the starting material glass plate 5 is cut simultaneously along an outer peripheral surface and an inner peripheral surface thereof using a hard metal cutter or a diamond cutter, thus making the starting material glass plate 5 into a donut shape having predetermined outside and inside diameters and having excellent concentricity between the outer and inner peripheral surfaces.

It should be noted that, although in the present embodiment the outer peripheral surface and the inner peripheral surface are cut simultaneously, it is also possible to first cut the outer peripheral surface to the predetermined outside diameter and then bore a hole to the predetermined inside diameter using a cylindrical diamond grindstone, or to press the starting material glass plate 5 out into the predetermined outside diameter and then bore a hole to the predetermined inside diameter using such a diamond grindstone.

(2) Edge Processing Step 7

In the edge processing step 7, the outer and inner peripheral surfaces of the donut-shaped starting material glass plate 5 are ground and polished so that the outside and inside diameters thereof become the desired outside and inside diameters of the magnetic disk substrate 1, thus manufacturing a glass substrate. Specifically, grinding of the inner and outer peripheral surfaces is carried out in 2 stages using grindstones having diamond abrasive grains attached thereto, with the grain size of the diamond abrasive grains being different in the two stages, and then chamfering of angular parts of the inner and outer peripheral surfaces is carried out.

The grain size of the diamond abrasive grains used is set as appropriate to be the most suitable in accordance with the required product quality. Moreover, it goes without saying that if, in the disk processing step 6 described above, the starting material glass plate 5 has already been cut so as to have inside and outside diameters close to the desired inside and outside diameters of the magnetic disk substrate 1, then it may not be necessary to carry out the grinding divided into two stages but rather one stage may suffice.

The inner and outer peripheral surfaces (including the chamfered parts; likewise hereinafter) are then smoothed by polishing using $CeO_2$ (cerium oxide) loose abrasive grains, so that the surface roughness Ra of the inner and outer peripheral surfaces becomes a predetermined value or less.

(3) Surface Polishing Step 8

In the surface polishing step 8, precision polishing 8a is carried out on the main surfaces of the glass substrate while feeding onto these surfaces a polishing agent prepared by dispersing loose abrasive grains having a mean grain diameter in a range of 0.01 μm to 1.3 μm and a 90% diameter in a range of 0.02 μm to 3.5 μm (ultra-fine abrasive grains) in a polishing liquid.

The reasons for thus limiting the grain diameter of the loose abrasive grains are as follows.

If the mean grain diameter exceeds 1.3 μm and/or the 90% diameter exceeds 3.5 μm, then the grain diameter of the loose abrasive grains as a whole will be large, and hence there will be a risk of new medium-wavelength waviness and short-wavelength waviness being formed when the precision polishing is carried out, and moreover the surfaces of the glass substrate will become prone to being scratched by the loose abrasive grains. On the other hand, if the mean grain diameter is less than 0.01 μm and/or the 90% diameter is less than 0.02 μm, then the grain diameter of the loose abrasive grains will be small, and hence the time required for the polishing will become long, and thus the productivity will drop.

In the present embodiment, the precision polishing 8a is thus carried out using loose abrasive grains having a mean grain diameter in a range of 0.01 μm to 1.3 μm and a 90% diameter in a range of 0.02 μm to 3.5 μm.

Moreover, in the precision polishing 8a, the polishing amount is such that 1 μm to 75 μm, preferably 1 μm to 25 μm, of glass is removed from each of the surfaces of the glass substrate. Specifically, when carrying out precision polishing using loose abrasive grains having a grain diameter as described above on a glass substrate having a good surface waviness as described above, if the polishing amount is less than 1 μm then, because the polishing amount is low, it will not be possible to sufficiently remove minute flaws formed on the surfaces of the glass substrate, whereas if the polishing amount exceeds 75 μm (preferably 25 μm), then polishing will be carried out to an excessive extent, and hence time will be wasted on the polishing, resulting in a drop in productivity.

In the present embodiment, the polishing amount in the precision polishing 8a is thus made to be in a range of 1 μm to 75 μm, preferably 1 μm to 25 μm, from the surfaces of the glass substrate.

There are no particular limitations on the type of the loose abrasive grains; for example, it is possible to use a rare earth oxide such as $CeO_2$ or $La_2O_3$, or $ZrO_2$, $MnO_2$, $Al_2O_3$, $SiO_2$ (colloidal silica) or the like. However, from the viewpoint of obtaining a good polishing efficiency, it is preferable to use rare earth oxide abrasive grains, in particular $CeO_2$ abrasive grains.

Moreover, there are no particular limitations on polishing pads used in the polishing; for example, nonwoven cloth polishing pads or foam polishing pads can be used. However, from the viewpoint of preventing the formation of scratches on the glass substrate, it is preferable to use suede pads formed from a base layer and a NAP layer, where the NAP layer is comprised of a continuous foam layer finished so as to form openings in the surface thereof.

In the present embodiment, the precision polishing 8a is carried out at a polishing rate in a range of 0.1 μm/min to 0.8 μm/min.

Moreover, after the precision polishing 8a has been carried out, the glass substrate is washed using an acidic aqueous solution, an alkaline aqueous solution, pure water or the like.

(4) Chemical Strengthening Treatment Step 9

In the chemical strengthening treatment step 9, the glass substrate is immersed for a predetermined time in a molten salt, for example a mixed molten salt of potassium nitrate ($KNO_3$) and sodium nitrate ($NaNO_3$), that has been adjusted to a predetermined temperature, thus carrying out chemical strengthening treatment in which ions such as $Li^{+1}$ and $Na^{+1}$ in the chemical components of the glass substrate are exchanged with $K_{+1}$, which has a higher ionic radius. By carrying out such chemical strengthening treatment, the surface compressive stress is raised, and hence the magnetic disk manufactured from the glass substrate can be prevented from breaking when rotated at high speed.

After the immersion in the molten salt, the glass substrate is annealed down to a temperature close to room temperature, and then molten salt attached to the glass substrate is washed off in warm pure water.

It should be noted that, depending on the required strength of the magnetic disk substrate 1, this chemical strengthening treatment step 9 can be omitted. Moreover, in the case that the starting material glass plate 5 is formed from a crystallized glass, chemical strengthening is not possible, and hence the chemical strengthening treatment step 9 is normally omitted.

(5) Finishing Washing Step 10

In the finishing washing step 10, the glass substrate that has been subjected to the precision polishing and if necessary the chemical strengthening treatment is washed by immersing in an acidic aqueous solution, an alkaline aqueous solution, pure water or a mixed solution thereof and if necessary irradiating with ultrasound. Foreign matter such as polishing agent stuck to the surfaces of the glass substrate or molten salt attached during the chemical strengthening treatment are thus removed, thus completing the manufacture of the magnetic disk substrate 1.

As described above, in the present embodiment, in the surface polishing step 8, only precision polishing 8a is carried out using loose abrasive grains (ultra-fine abrasive grains) having a mean grain diameter in a range of 0.01 μm to 1.3 μm and a 90% diameter in a range of 0.02 μm to 3.5 μm (first predetermined grain diameter). The substrate for information recording media is thus manufactured without carrying out rough polishing, and hence there is no new formation of medium-wavelength waviness and/or short-wavelength waviness due to rough polishing. Moreover, by selecting a starting material glass plate having good surface waviness properties, a high-quality substrate for information recording media having an excellent planarity can be manufactured easily in a short time and with a low polishing amount. Moreover, because the polishing amount is low, the discharge of industrial waste such as polishing waste is suppressed, which is excellent environmentally.

Figure 8:
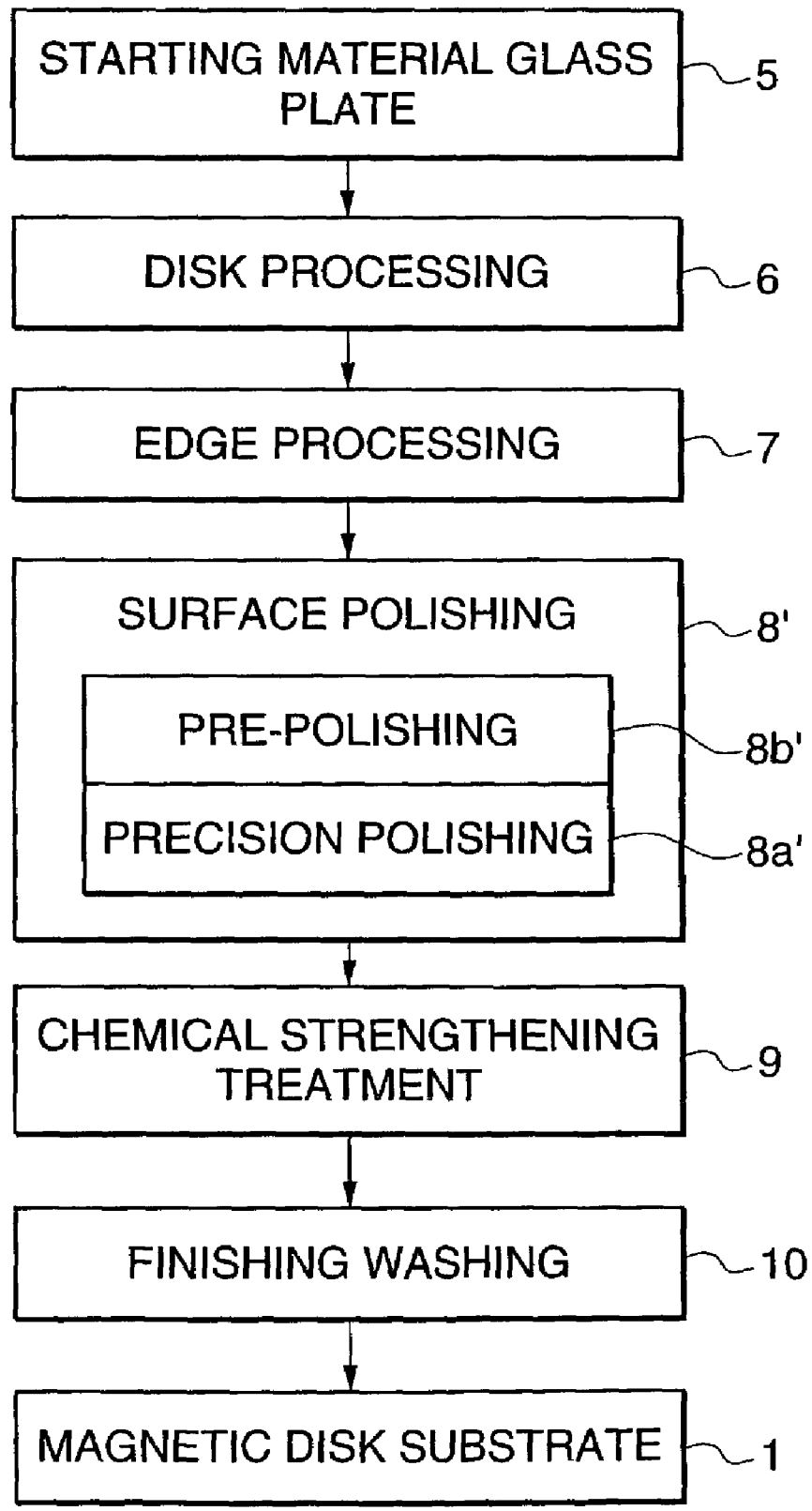
FIG. 8 is a flowchart showing a method of manufacturing a substrate for information recording media according to another embodiment of the present invention.

FIG. 8 is a flowchart showing a method of manufacturing a magnetic disk substrate, i.e. a substrate for information recording media, according to a second embodiment of the present invention. In the present embodiment, in a surface polishing step 8', pre-polishing 8b' is carried out before carrying out precision polishing 8a', thus further reducing the time required for the surface polishing step 8'.

The pre-polishing 8b' is carried out using loose abrasive grains (fine abrasive grains) having a grain diameter larger than the loose abrasive grains used in the precision polishing 8a', specifically loose abrasive grains having a mean grain diameter in a range of 0.3 μm to 5 μm and a 90% diameter in a range of 1 μm to 15 μm.

The reasons for using loose abrasive grains having a grain diameter as above in the pre-polishing 8b' are as follows.

If the mean grain diameter exceeds 5 μm and/or the 90% diameter exceeds 15 μm, then the grain diameter will be large, resulting in the risk of minute flaws occurring or short-wavelength waviness being formed. On the other hand, if the mean grain diameter is less than 0.3 μm and/or the 90% diameter is less than 1 μm, then because the grain diameter is small, it will not be possible to achieve the intended objective of reducing the polishing time. In the present embodiment, the pre-polishing 8b' is thus carried out using loose abrasive grains having a mean grain diameter in a range of 0.3 μm to 5 μm and a 90% diameter in a range of 1 μm to 15 μm.

Moreover, the type of loose abrasive grains used in the pre-polishing 8b' and the precision polishing 8a' may be the same as that used in the precision polishing 8a in the first embodiment, but it is also preferable for different types of loose abrasive grains to be used between the pre-polishing 8b' and the precision polishing 8a'. For example, the polishing can be carried out using a combination of $Al_2O_3$ and $CeO_2$, $CeO_2$ and $SiO_2$ (colloidal silica), $ZrO_2$ and $CeO_2$, or $CeO_2$ and $MnO_2$ in the pre-polishing 8b' and the precision polishing 8a' respectively.

In the second embodiment, the pre-polishing 8b' is thus carried out using loose abrasive grains (fine abrasive grains) having a grain diameter (second predetermined grain diameter) larger than that of the loose abrasive grains used in the precision polishing 8a', specifically a mean grain diameter in a range of 0.3 μm to 5 μm and a 90% diameter in a range of 1 μm to 15 μm, and then the precision polishing 8a' is carried out. As a result, the polishing time required for the surface polishing can be further reduced, and hence the productivity of manufacturing a magnetic disk substrate 1 having a high product quality and an excellent reliability can be improved.

Figure 9:
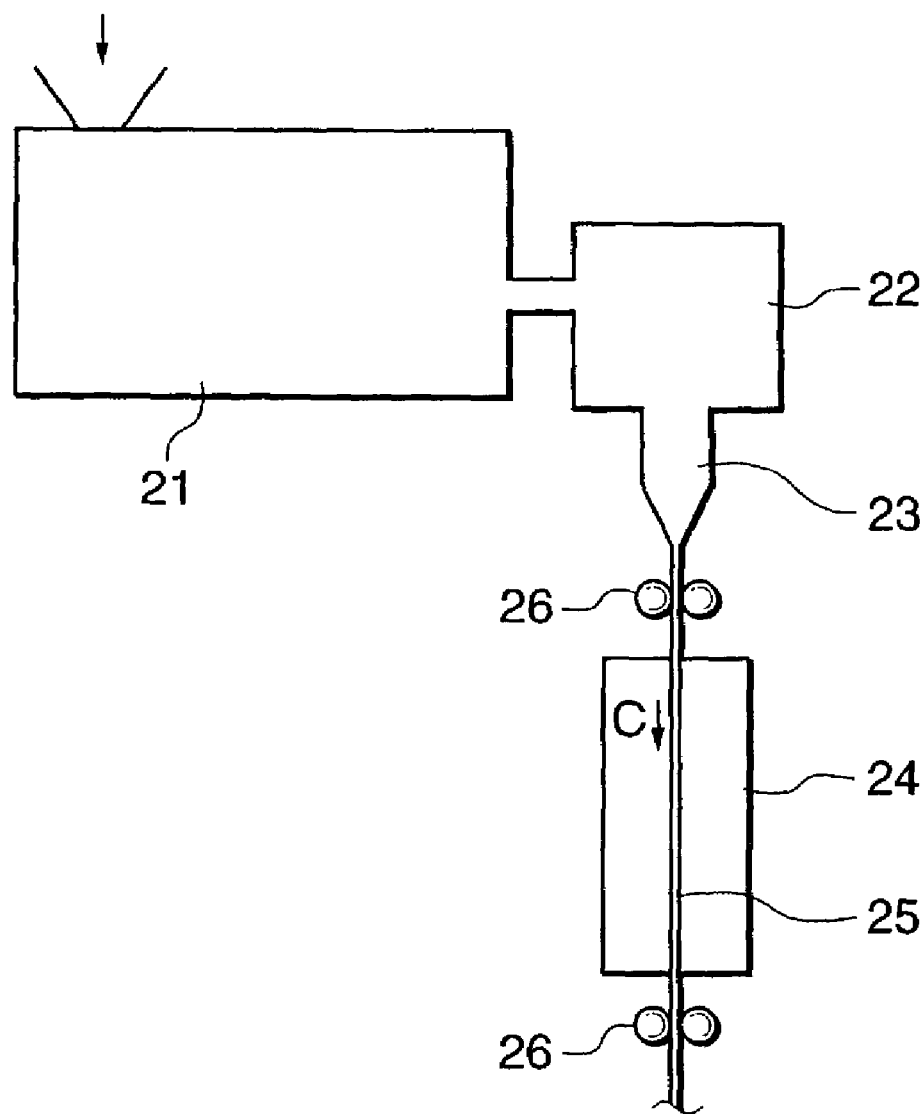
FIG. 9 is a schematic view showing the construction of a down draw plate glass manufacturing apparatus.

FIG. 9 is a schematic structural view showing a down draw plate glass manufacturing apparatus, which is another embodiment of the apparatus for manufacturing the starting material glass plate. The down draw plate glass manufacturing apparatus has as principal parts thereof a melting furnace 21 into which a predetermined glass material powder is charged and in which the glass material powder is melted under a predetermined high-temperature atmosphere, a working bath 22 in which the molten glass is adjusted to a predetermined temperature, a slot 23 that has a restriction and is formed from platinum and through which the molten glass is drawn from the working bath 22 to form a glass ribbon 25, and an annealing furnace 24 in which the glass ribbon 25 is annealed.

In the down draw plate glass manufacturing apparatus constructed as above, the glass material powder, which has been prepared to a predetermined composition, is charged into the melting furnace 21, which has been heated to 1500 to 1600° C., whereupon the glass material powder is melted in the melting furnace 21 to form the molten glass. The molten glass then flows into the working bath 22, where the molten glass is homogenized and adjusted to a temperature suitable for the forming. The molten glass then flows out downwards from the working bath 22 via the slot 23. The speed of dropping of the molten glass is adjusted to a predetermined speed by means of gravity (shown by the arrow C in FIG. 9) and the rotational force from rollers 26, thus forming a glass ribbon 25 having a predetermined thickness. The glass ribbon 25 is then cut into predetermined rectangular shapes, thus obtaining starting material glass plates.

In this down draw method, the temperature of the molten glass passing through the slot 23 and the temperature of the slot 23 itself, and the temperature distribution in the width direction of the slot 23, determine the thickness distribution and the surface quality such as the planarity (waviness properties) of the glass ribbon 25 (the starting material glass plates). Conditions are thus devised such that a glass ribbon 25 having excellent product quality can be obtained, for example a platinum restriction can be used as the slot 23 as shown in FIG. 9, or alternatively a refractory fusion pipe can be used.

Moreover, in the down draw method, the glass ribbon 25 drawn from the slot 23 drops through free space inside the annealing furnace 24 under gravity while an end part thereof is held between the rollers 26. The speed of dropping and temperature gradient of the molten glass, and the air flow and temperature distribution in the width direction inside the free space through which the molten glass passes are controlled such that the surface waviness of the glass ribbon 25 (the starting material glass plates) is low. As a result, a glass ribbon 25 (starting material glass plates) having a long-wavelength waviness in a range of 0.4 nm to 6 nm, a medium-wavelength waviness in a range of 0.25 nm to 2 nm, and a short-wavelength waviness in a range of 0.1 nm to 0.7 nm is manufactured.

It should be noted that the present invention is not limited to the embodiments described above. For example, in the embodiments described above the starting material glass plate 5 was manufactured using a float method or a down draw method, but so long as a starting material glass plate 5 having a long-wavelength waviness in a range of 0.4 nm to 6 nm, a medium-wavelength waviness in a range of 0.25 nm to 2 nm, and a short-wavelength waviness in a range of 0.1 nm to 0.7 nm can be manufactured, there are no particular limitations on the manufacturing method. For example, the starting material glass plate 5 may be manufactured using a redraw method in which a mother glass sheet that has been formed into a sheet shape using a melting bath or the like is reheated in a heating furnace to lower the viscosity of the glass, the mother glass sheet is made thinner by drawing in a downwards direction or a horizontal direction, and then annealing is carried out in an annealing furnace.

EXAMPLES

A description will now be given of specific examples of the present invention.

First Examples

The present inventors manufactured the following test pieces: using pieces of float plate glass (starting material glass plates) having good surface waviness properties, test pieces for which only precision polishing was carried out (Examples 1 to 5), and test pieces for which pre-polishing and then precision polishing were carried out (Examples 6 to 8); using pieces of down draw plate glass (starting material glass plates) having good surface waviness properties, test pieces for which only precision polishing was carried out (Example 9); using float plate glass (starting material glass plates) having good surface waviness properties, test pieces for which rough polishing was incorporated into the surface polishing step (Comparative Examples 1 and 2); and using starting material glass plates having surface waviness outside the ranges according to the present invention, test pieces for which various types of surface polishing were carried out (Comparative Examples 3 to 5). For each of the test pieces, the surface waviness was measured and thus the surface properties evaluated before and after the surface polishing, i.e. immediately after the grinding of the inner and outer peripheral surfaces and then after the precision polishing had been completed.

For each of the examples and comparative examples, Table 1 shows the method of manufacturing the starting material glass plates, the surface properties of the starting material glass plates, and the details of the surface polishing; Table 2 shows, amongst other things, the surface properties of the magnetic disk substrates obtained.

It should be noted that the long-wavelength waviness and the medium-wavelength waviness were measured over a diameter range of 38 mm to 84 mm using an Optiflat optical-type surface waviness measuring instrument made by Phase Shift Technology, and the short-wavelength waviness was measured at three places, namely the inner periphery, the outer periphery and a circle midway between the inner periphery and the outer periphery, using a Newview 200 optical-type surface roughness meter made by Zygo, and mean values were calculated. Moreover, the measurement values shown in the tables are mean values over a large number of test pieces (300 or 500) manufactured in the example or comparative example in question.

Moreover, the polishing amount was calculated by measuring the thickness of each test piece before and after the polishing using a micrometer made by Mitsutoyo Corporation.

TABLE 1

| | | Starting Material Glass Plate | | | | Surface Polishing | | | | | | |
|---|---|---|---|---|---|---|---|---|---|---|---|---|
| | | | Surface Waviness | | | Rough Polishing | | | | Pre-Polishing | | |
| | | | (nm) | | | | Mean | | | | Mean | |
| | | Manufacturing Method | Long Wavelength | Medium Wavelength | Short Wavelength | Abrasive Grains | Grain Diameter (μm) | 90% Diameter (μm) | Polishing Time (min) | Abrasive Grains | Grains Diameter (μm) | 90% Diameter (μm) |
| Examples | 1 | Float Method | 3.5 | 1.6 | 0.7 | — | — | — | — | — | — | — |
| | 2 | Float Method | 3.5 | 1.6 | 0.7 | — | — | — | — | — | — | — |
| | 3 | Float Method | 3.6 | 1.2 | 0.4 | — | — | — | — | — | — | — |
| | 4 | Float Method | 3.6 | 1.2 | 0.4 | — | — | — | — | — | — | — |
| | 5 | Float Method | 1.2 | 0.6 | 0.3 | — | — | — | — | — | — | — |
| | 6 | Float Method | 3.5 | 1.6 | 0.7 | — | — | — | — | $CeO_2$ | 3 | 8 |
| | 7 | Float Method | 3.6 | 1.2 | 0.4 | — | — | — | — | $CeO_2$ | 3 | 7.5 |
| | 8 | Float Method | 3.6 | 1.2 | 0.4 | — | — | — | — | $CeO_2$ | 1 | 3 |
| | 9 | Down Draw Method | 1.8 | 0.9 | 0.4 | — | — | — | — | — | — | — |
| Comparative Examples | 1 | Float Method | 3.5 | 1.6 | 0.7 | $Al_2O_3$ | 5.5 | 10 | 35 | — | — | — |
| | 2 | Float Method | 3.5 | 1.6 | 0.7 | $Al_2O_3$ | 9 | 20 | 20 | $CeO_2$ | 3 | 7.5 |
| | 3 | Float Method | 7.0 | 2.6 | 1.0 | $Al_2O_3$ | 9 | 20 | 20 | — | — | — |
| | 4 | Float Method | 7.0 | 2.6 | 1.0 | — | — | — | — | $CeO_2$ | 3 | 8 |
| | 5 | Float Method | 7.0 | 2.6 | 1.0 | — | — | — | — | — | — | — |

| | | Surface Polishing | | | | | |
|---|---|---|---|---|---|---|---|
| | | Pre-Polishing | Precision Polishing | | | | |
| | | | | Mean | | | Total |
| | | Polishing Time (min) | Abrasive Grains | Grain Diameter (μm) | 90% Diameter (μm) | Polishing Time (min) | Polishing Time (min) |
| Examples | 1 | — | $CeO_2$ | 1 | 3 | 40 | 40 |
| | 2 | — | $CeO_2$ | 1 | 3 | 60 | 60 |
| | 3 | — | $CeO_2$ | 1 | 2.8 | 60 | 60 |
| | 4 | — | $CeO_2$ | 0.3 | 1.2 | 120 | 120 |
| | 5 | — | $CeO_2$ | 1 | 3 | 20 | 20 |
| | 6 | 7 | $CeO_2$ | 1 | 3 | 20 | 27 |
| | 7 | 9 | $CeO_2$ | 0.3 | 1.2 | 30 | 39 |
| | 8 | 40 | Colloidal Silica | 0.02 | 0.03 | 30 | 70 |
| | 9 | — | $CeO_2$ | 1 | 3 | 40 | 40 |

TABLE 1-continued

| | | | | | | | |
|---|---|---|---|---|---|---|---|
| Comparative | 1 | — | $CeO_2$ | 1 | 3 | 40 | 75 |
| Examples | 2 | 30 | $CeO_2$ | 1 | 3 | 40 | 90 |
| | 3 | — | $CeO_2$ | 1 | 3 | 35 | 55 |
| | 4 | 60 | $CeO_2$ | 1 | 3 | 40 | 100 |
| | 5 | — | $CeO_2$ | 1 | 3 | 200 | 200 |

TABLE 2

| | | Number of | | Magnetic Disk Substrate | | | |
|---|---|---|---|---|---|---|---|
| | | Polishing | Surface | Surface Waviness (nm) | | | |
| | | Amount (μm) | Polishing Steps | Long Wavelength | Medium Wavelength | Short Wavelength | Minute Flaws | Evaluation |
| Examples | 1 | 10 | 1 | 1.0 | 0.6 | 0.4 | 1/300 | ○ |
| | 2 | 15 | 1 | 0.8 | 0.5 | 0.3 | 2/300 | ○ |
| | 3 | 15 | 1 | 0.8 | 0.6 | 0.3 | 2/500 | ○ |
| | 4 | 12 | 1 | 1.1 | 0.6 | 0.15 | 1/300 | ○ |
| | 5 | 5 | 1 | 0.6 | 0.4 | 0.2 | 1/300 | ○ |
| | 6 | 10 | 2 | 1.0 | 0.65 | 0.4 | 4/300 | ○ |
| | 7 | 10 | 2 | 0.5 | 0.35 | 0.2 | 5/500 | ○ |
| | 8 | 10.3 | 2 | 0.9 | 0.6 | 0.2 | 1/500 | ○ |
| | 9 | 10 | 1 | 0.5 | 0.3 | 0.2 | 6/300 | ○ |
| Comparative | 1 | 110 | 2 | 1.0 | 0.8 | 1.5 | 72/300 | X |
| Examples | 2 | 230 | 3 | 0.8 | 0.5 | 0.35 | 15/300 | Δ |
| | 3 | 210 | 2 | 1.7 | 1.0 | 1.8 | 105/300 | X |
| | 4 | 50 | 2 | 1.1 | 0.7 | 0.5 | 3/300 | Δ |
| | 5 | 50 | 1 | 1.2 | 0.7 | 0.45 | 4/300 | Δ |

A description will now be given of the procedure for manufacturing the test pieces for each of the Examples and Comparative Examples.

Example 1

The present inventors first manufactured lithium-alumina-silica type starting material glass plates using a float plate glass manufacturing apparatus as shown in FIG. 7. Specifically, glass material powders were charged into the melting furnace such that the glass composition would be 70 mol % $SiO_2$, 15 mol % $Al_2O_3$, 7 mol % $Li_2O$ and 8 mol % $Na_2O$, and were melted in the melting furnace. The molten mixture was then made to flow into the forming bath, thus producing a glass ribbon, next the glass ribbon was moved along the top of the molten tin while controlling the temperature in the forming bath according to predetermined forming conditions enabling good surface waviness properties to be obtained, and then the glass ribbon was conveyed from the forming bath into the annealing furnace. The glass ribbon thus obtained from the manufacturing lot was then cut into rectangles, thus obtaining 300 starting material glass plates of thickness approximately 1 mm.

Next, each starting material glass plate was processed into a donut shape by cutting simultaneously along the outer peripheral surface and the inner peripheral surface thereof using a diamond cutter, such that the outside diameter became 95 mm and the inside diameter 25 mm.

After that, grinding of the inner and outer peripheral surfaces and chamfering of angular parts thereof were carried out using grindstones having diamond abrasive grains attached thereto, and then the inner and outer peripheral surfaces including the chamfered parts were mirror-finished by polishing using $CeO_2$ abrasive grains.

Next, precision polishing of the surfaces of each starting material glass plate was carried out for 40 minutes while feeding onto the surfaces of the starting material glass plate a polishing agent prepared by dispersing $CeO_2$ abrasive grains having a mean grain diameter of 1 μm and a 90% diameter of 3 μm in a polishing liquid, thus preparing the test pieces of Example 1. Note that suede pads were used as the polishing pads.

Example 2

300 starting material glass plates from the same manufacturing lot as in Example 1 were subjected to the same disk processing and edge processing as in Example 1, and then precision polishing was carried out for 60 minutes using the same $CeO_2$ abrasive grains as in Example 1, thus preparing the test pieces of Example 2.

Example 3

Another manufacturing lot of glass ribbon was prepared using the same glass material powder composition and forming conditions as in Example 1. The glass ribbon was then cut into rectangles, thus obtaining 500 starting material glass plates of thickness approximately 1 mm.

Next, the same disk processing and edge processing as in Example 1 were carried out, and then precision polishing was carried out for 60 minutes using $CeO_2$ abrasive grains having a mean grain diameter of 1 μm and a 90% diameter of 2.8 μm, thus preparing the test pieces of Example 3.

Example 4

300 starting material glass plates were obtained from the same manufacturing lot as in Example 3 and subjected to the same disk processing and edge processing as in Example 1, and then precision polishing was carried out for 120 minutes using $CeO_2$ abrasive grains having a mean grain diameter of 0.3 μm and a 90% diameter of 1.2 μm, thus preparing the test pieces of Example 4.

Example 5

A glass ribbon was prepared using the same glass material powder composition as in Example 1, but changing the forming conditions so as to make the surface waviness yet smaller. The glass ribbon was then cut into rectangles, thus obtaining 300 starting material glass plates of thickness approximately 1 mm.

Next, the same disk processing and edge processing as in Example 1 were carried out, and then precision polishing was carried out for 20 minutes using the same $CeO_2$ abrasive grains as in Example 1, thus preparing the test pieces of Example 5.

Example 6

300 starting material glass plates were obtained from the same manufacturing lot as in Example 1 and subjected to the same disk processing and edge processing as in Example 1, then pre-polishing was carried out for 7 minutes using $CeO_2$ abrasive grains having a mean grain diameter of 3 μm and a 90% diameter of 8 μm, and then precision polishing was carried out for 20 minutes using the same $CeO_2$ abrasive grains as in Example 1 (mean grain diameter 1 μm, 90% diameter 3 μm), thus preparing the test pieces of Example 6. In Example 6, 7 minutes of pre-polishing and 20 minutes of precision polishing, i.e. a total of 27 minutes of surface polishing, were thus carried out.

Example 7

500 starting material glass plates were obtained from the same manufacturing lot as in Example 3 and subjected to the same disk processing and edge processing as in Example 1, then pre-polishing was carried out for 9 minutes using $CeO_2$ abrasive grains having a mean grain diameter of 3 μm and a 90% diameter of 7.5 μm, and then precision polishing was carried out for 30 minutes using the same $CeO_2$ abrasive grains as in Example 4 (mean grain diameter 0.3 μm, 90% diameter 1.2 μm), thus preparing the test pieces of Example 7. In Example 7, 9 minutes of pre-polishing and 30 minutes of precision polishing, i.e. a total of 39 minutes of surface polishing, were thus carried out.

Example 8

500 starting material glass plates were obtained from the same manufacturing lot as in Example 3 and subjected to the same disk processing and edge processing as in Example 1, then pre-polishing was carried out for 40 minutes using $CeO_2$ abrasive grains having a mean grain diameter of 1 μm and a 90% diameter of 3 μm, and then precision polishing was carried out for 30 minutes using colloidal silica abrasive grains having a mean grain diameter of 0.02 μm and a 90% diameter of 0.03 μm, thus preparing the test pieces of Example 8. In Example 8, 40 minutes of pre-polishing and 30 minutes of precision polishing, i.e. a total of 70 minutes of surface polishing, were thus carried out.

Example 9

Starting material glass plates were manufactured using the same glass material powder composition as in Example 1, but using a down draw plate glass manufacturing apparatus as shown in FIG. 9. Specifically, the glass material powders were charged into the melting furnace to prepare a molten glass, then the molten glass was made to flow out downwards from the platinum orifice (slot) using gravity to form a glass sheet, then annealing was carried out in the annealing furnace, and then the glass sheet was cut into rectangles, thus obtaining 300 starting material glass plates.

Disk processing, edge processing and precision polishing were then carried out as in Example 1, thus preparing the test pieces of Example 9.

Comparative Example 1

300 starting material glass plates were obtained from the same manufacturing lot as in Example 1 and subjected to the same disk processing and edge processing as in Example 1, then rough polishing was carried out for 35 minutes using $Al_2O_3$ abrasive grains having a mean grain diameter of 5.5 μm and a 90% diameter of 10 μm, and then precision polishing was carried out as in Example 1, thus preparing the test pieces of Comparative Example 1. In Comparative Example 1, 35 minutes of rough polishing and 40 minutes of precision polishing, i.e. a total of 75 minutes of surface polishing, were thus carried out.

Comparative Example 2

300 starting material glass plates were obtained from the same manufacturing lot as in Example 1 and subjected to the same disk processing and edge processing as in Example 1, and then surface polishing divided into the three stages of rough polishing, pre-polishing and precision polishing as conventionally was carried out. Specifically, rough polishing was first carried out for 20 minutes using $Al_2O_3$ abrasive grains having a mean grain diameter of 9 μm and a 90% diameter of 20 μm, then pre-polishing was carried out for 30 minutes using $CeO_2$ abrasive grains having a mean grain diameter of 3 μm and a 90% diameter of 7.5 μm, and then precision polishing was carried out for 40 minutes using the same $CeO_2$ abrasive grains as in Example 1 (mean grain diameter 1 μm, 90% diameter 3 μm), thus preparing the test pieces of Example 2. In Comparative Example 2, 20 minutes of rough polishing, 30 minutes of pre-polishing and 40 minutes of precision polishing, i.e. a total of 90 minutes of surface polishing, were thus carried out.

Comparative Example 3

Using the same glass material powder composition as in Example 1, a glass ribbon was manufactured using a float plate glass manufacturing apparatus but without carrying out sufficient temperature control in the forming bath, and then the glass ribbon was cut into rectangles, thus obtaining 300 starting material glass plates of thickness approximately 1mm.

Next, the same disk processing and edge processing were carried out as in Example 1, then rough polishing was carried out for 20 minutes as in Comparative Example 2, and then precision polishing was carried out for 35 minutes as in Example 1, thus preparing the test pieces of Comparative Example 3. In Comparative Example 3, 20 minutes of rough polishing and 35 minutes of precision polishing, i.e. a total of 55 minutes of surface polishing, were thus carried out.

Comparative Example 4

300 starting material glass plates were obtained from the same manufacturing lot as in Comparative Example 3 and subjected to the same disk processing and edge processing as in Example 1, and then 60 minutes of pre-polishing and 40 minutes of precision polishing were carried out under the same conditions as in Example 6, thus preparing the test pieces of Comparative Example 4.

Comparative Example 5

300 starting material glass plates were obtained from the same manufacturing lot as in Comparative Example 3 and subjected to the same disk processing and edge processing as in Example 1, and then 200 minutes of precision polishing was carried out using the same $CeO_2$ abrasive grains as in Example 1, thus preparing the test pieces of Comparative Example 5.

As can be seen from the measurement results in Table 1 and Table 2, the long-wavelength waviness, the medium-wavelength waviness and the short-wavelength waviness of the starting material glass plates in Example 1 were all low at 3.5 nm, 1.6 nm and 0.7 nm respectively. After the precision polishing, the long-wavelength waviness, the medium-wavelength waviness and the short-wavelength waviness of the magnetic disk substrates were thus also all low at 1.0 nm, 0.6 nm and 0.4 nm respectively. It was thus possible to manufacture magnetic disk substrates having an excellent planarity, with the medium-wavelength waviness and the short-wavelength waviness in particular being suppressed. Furthermore, the polishing amount was low at 10 µm, and hence it was possible to obtain excellent surface waviness properties with a low polishing amount. Moreover, when it was verified by visual observation whether or not minute flaws had occurred, a good result was obtained, namely there were minute flaws on only 1 out of the 300 test pieces. It was thus found that the probability of minute flaws occurring is extremely low.

In Example 2, the polishing time was increased by 1.5 times compared with Example 1. Because the polishing time was increased, the polishing amount became somewhat higher at 15 µm, but the surface waviness properties of the magnetic disk substrates were further improved.

In Example 3, the magnetic disk substrates were prepared from starting material glass plates under approximately the same conditions as in Example 2. It can be seen from the tables that similar surface waviness properties to Example 2 were thus obtained.

In Example 4, the grain diameter of the $CeO_2$ abrasive grains used as the loose abrasive grains in the precision polishing was reduced compared with Examples 1 to 3, specifically, the mean grain diameter was made to be 0.3 µm and the 90% diameter 1.2 µm. The polishing rate was thus somewhat slower, and hence the polishing amount was low at 12 µm despite a long polishing time of 120 minutes. However, the short-wavelength waviness was improved compared with Examples 1 to 3. It was thus found that the short-wavelength waviness can be reduced by carrying out the precision polishing using finer loose abrasive grains.

In Example 5, the surface waviness properties of the starting material glass plates were yet better than in Examples 1 to 4, in particular the long-wavelength waviness. It was thus possible to manufacture magnetic disk substrates having an extremely good planarity in a short polishing time of 20 minutes and with a low polishing amount of 5 µm.

In Example 6, pre-polishing was carried out using $CeO_2$ abrasive grains having a mean grain diameter of 3 µm and a 90% diameter of 8 µm, and then precision polishing was carried out as in Example 1. Because the pre-polishing was carried out, it was possible to obtain magnetic disk substrates having excellent surface waviness properties in a shorter time than in Example 1. However, because the prepolishing was carried out using $CeO_2$ abrasive grains having a larger grain diameter than $CeO_2$ abrasive grains used in the precision polishing, the frequency of occurrence of minute flaws was somewhat greater than when only precision polishing was carried out, at 4 out of 300 test pieces. Nevertheless, the yield was 99%, and hence sufficiently satisfactory results were obtained.

As can be seen from Examples 1 to 6, given that the starting material glass plates have approximately the same surface waviness properties, the total polishing time can be reduced by carrying out pre-polishing.

In Example 7, pre-polishing was also carried out using $CeO_2$ abrasive grains approximately the same as those used in Example 6, and then precision polishing was carried out. However, the $CeO_2$ abrasive grains used in the precision polishing had a low mean grain diameter and 90% diameter of 0.3 µm and 1.2 µm respectively. It can be seen that as a result it was possible to obtain magnetic disk substrates having extremely good surface waviness properties in a short time. Moreover, although the frequency of occurrence of minute flaws was somewhat increased compared with when only precision polishing was carried out at 5 out of 500 magnetic disk substrates, the yield was nevertheless 99%, and hence sufficiently satisfactory results were obtained.

In Example 8, pre-polishing was carried out using $CeO_2$ abrasive grains having a low grain diameter overall, specifically a 90% diameter of 3 µm, and then precision polishing was carried out using fine colloidal silica. Because the grain diameter was low, the polishing rate was somewhat slow, specifically the polishing amount was 10.3 µm with a polishing time of 70 minutes. However, good surface waviness properties were obtained.

In Example 9, the starting material glass plates were manufactured using the down draw method. It was found that even in the case of manufacturing the starting material glass plates using the down draw method, by suitably carrying out temperature control, starting material glass plates having excellent surface waviness properties can be prepared, and moreover that so long as the starting material glass plates have good surface waviness properties, magnetic disk substrates having an excellent planarity (surface waviness properties) can be obtained regardless of the method of manufacturing the starting material glass plates.

As described above, in Examples 1 to 9, by using starting material glass plates having excellent surface waviness properties, it was possible to manufacture magnetic disk substrates having an excellent planarity with desired surface waviness properties by carrying out only precision polishing or only pre-polishing and precision polishing with no rough polishing. Moreover, because rough polishing was not carried out, it was possible to manufacture the magnetic disk substrates in a short time and with a low polishing amount. Furthermore, it was verified that the probability of occurrence of minute flaws was extremely low at 1% or less.

In contrast with the above, in Comparative Example 1, rough polishing using $Al_2O_3$ abrasive grains having a mean grain diameter of 5.5 µm and a 90% diameter of 10 µm was carried out on starting material glass plates obtained from the same manufacturing lot as in Example 1. The surface waviness properties of the magnetic disk substrates measured after the precision polishing were that the long-wavelength waviness and the medium-wavelength waviness were low at 1.0 nm and 0.8 nm respectively, but the short-wavelength waviness had increased to 1.5 nm. It is thought that this is because short-wavelength waviness was newly formed through carrying out the rough polishing.

Incidentally, the surface waviness properties were also measured immediately after the rough polishing, whereupon it was found that the long-wavelength waviness had been suppressed to 2.5 nm, but the medium-wavelength waviness and the short-wavelength waviness were large at 1.8 nm and 2.2 nm respectively. Moreover, it was found through visual inspection that there were minute flaws on 72 out of the 300 test pieces, and hence it was found that defective articles were manufactured at a probability of over 20%.

In Comparative Example 2, rough polishing similar to that of Comparative Example 1 was carried out on starting material glass plates obtained from the same manufacturing lot as in Example 1. It is thus assumed that medium-wavelength waviness and short-wavelength waviness were newly formed through the rough polishing. Although it was possible to obtain good magnetic disk substrate surface waviness properties as shown in Table 2, to achieve this it was necessary to carry out a large amount of polishing, specifically 230 μm, on the substrate surfaces. In such a case, it is necessary to initially make the starting material glass plates thicker, and moreover a large amount of polishing waste is discharged, resulting in an increase in the amount of industrial waste.

In Comparative Example 3, rough polishing and precision polishing were carried out as in Comparative Example 1, but using starting material glass plates having poor surface waviness properties. Even though a large amount of polishing, specifically 210 μm, was carried out, the long-wavelength waviness, the medium-wavelength waviness and the short-wavelength waviness of the magnetic disk substrates were thus all poor at 1.7 nm, 1.0 nm and 1.8 nm respectively. Moreover, it was found through visual inspection that there were minute flaws on 105 out of 300 of the test pieces, and hence the proportion of test pieces on which minute flaws occurred was greater than 30%.

In Comparative Example 4, pre-polishing and precision polishing were carried out as in Example 6 but using starting material glass plates obtained from the same manufacturing lot as in Comparative Example 3. It was possible to obtain magnetic disk substrates having good surface waviness properties as shown in Table 2, but because the surface waviness properties of the starting material glass plates were poor, to obtain magnetic disk substrates having good surface waviness properties, it was necessary to make the polishing amount high at 50 μm, and moreover the total polishing time was long at 100 minutes; this manufacturing method is thus unsuited to mass production.

In Comparative Example 5, starting material glass plates from the same manufacturing lot as in Comparative Example 3 were used, and moreover only precision polishing as in Example 1 was carried out. As a result, to obtain good surface waviness properties, a very long polishing time of 200 minutes was required; this manufacturing method is thus very unsuited to mass production.

Second Examples

Next, using test pieces from Example 1 and Comparative Example 1, the present inventors used a known sputtering method to build up a foundation layer made of CrMo, a magnetic layer made of CoCrPt and a protective layer made of hydrogenated carbon in this order on the surfaces of each test piece, thus preparing magnetic disks. Touch down height tests were then carried out, and the modulation was measured.

[Touch Down Height Tests]

The present inventors carried out touch down height tests in which a magnetic head is lowered down while rotating a magnetic disk, and the minimum flying height at which the magnetic head can fly stably is evaluated. For the test pieces from Comparative Example 1, the touch down height was high at 11 nm, and there was thus a risk that it would not be possible to cope with a low flying height of 10 nm or less. With the test pieces from Example 1, on the other hand, a good result of the touch down height being 5 nm or less was obtained, and hence it was verified that the magnetic disks were suitable for use at a low flying height.

[Modulation Measurements]

The modulation M is defined as in equation (1) below, where Vmax (mV) and Vmin (mV) are the maximum output and minimum output of the magnetic disk as measured using an oscilloscope. It is considered that for a magnetic disk to have a good flatness with little surface undulation, it is preferable for the modulation M to be not more than 8%.

$$M=\{(V\max-V\min)/(V\max+V\min)\}\times 100 \quad (1)$$

For the magnetic disks from Comparative Example 1, the modulation M had a large value of 10% or more, whereas for the magnetic disks from Example 1, the modulation M was low at 4%, showing that the magnetic disks from Example 1 had a good flatness.

INDUSTRIAL APPLICABILITY

According to the substrate for information recording media and manufacturing method thereof of the present invention, the substrate for information recording media is manufactured through only precision polishing using ultra-fine abrasive grains of a predetermined grain diameter, or only pre-polishing using fine abrasive grains of a predetermined grain diameter and precision polishing using ultra-fine abrasive grains of a predetermined grain diameter, and without carrying out rough polishing. As a result, by using a starting material glass plate having excellent surface waviness properties, a substrate for information recording media having good planarity with excellent surface waviness properties can be obtained in a short time and with a low polishing amount, which is useful in terms of improving productivity. Moreover, because the substrate for information recording media has a very excellent planarity, it can be ensured that even a small magnetic head follows the substrate well, and hence the substrate for information recording media of the present invention can be used as a substrate for today's small-sized large-capacity high-recording-density information recording media.

Moreover, the starting material glass plate according to the present invention has excellent flatness and planarity, and hence can be used in various applications where a high degree of flatness and planarity is required.

The invention claimed is:

1. A method of manufacturing a substrate for information recording media, comprising:
  carrying out surface polishing on at least one surface of a sheet-shaped starting material glass plate manufactured by a floating process;
  wherein a plurality of types of surface waviness classified by wavelength band are formed in a fashion superimposed on one another on the at least one surface of the starting material glass plate, and a long-wavelength waviness for which the wavelength band is highest out of the tyes of surface waviness is formed to not more than 6 nm;
wherein said surface polishing consists essentially of precision polishing using fine abrasive grains having a predetermined grain diameter.

2. A method of manufacturing a substrate for information recording media, comprising:
carrying out surface polishing on at least one surface of a sheet-shaped starting material glass plate manufactured by a floating process;
wherein a plurality of types of surface waviness classified by wavelength band are formed in a fashion superimposed on one another on the at least one surface of the starting material glass plate, and a long-wavelength waviness for which the wavelength band is highest out of the types of surface waviness is formed to not more than 6 nm; and
wherein said surface polishing consists essentially of pre-polishing and precision polishing, wherein said precision polishing is carried out using ultra-fine abrasive grains having a first predetermined grain diameter, and said pre-polishing is carried out using ultra-fine abrasive grains having a second predetermined grain diameter larger than the first predetermined grain diameter.

3. A method as claimed in claim 1, wherein a mean grain diameter of the predetermined grain diameter is not more than 1.3 μm, and a 90% diameter of a volume grain size distribution thereof is not more than 3.5 μm.

4. A method as claimed in claim 1, wherein a mean grain diameter of the predetermined grain diameter is not less than 0.01 μm, and a 90% diameter of a volume grain size distribution thereof is not less than 0.02 μm.

5. A method as claimed in claim 2, wherein a mean grain diameter of the second predetermined grain diameter is in a range of 0.3 μm to 5 μm, and a 90% diameter of a volume grain size distribution thereof is in a range of 1 μm to 15 μm.

6. A method as claimed in claim 1, wherein the long-wavelength waviness is formed to not less than 0.4 nm.

7. A method as claimed in claim 1, wherein the starting material glass plate is formed such that a short-wavelength waviness for which the wavelength band is lowest is in a range of 0.1 nm to 0.7 nm, and a medium-wavelength waviness for which the wavelength band is intermediate between the wavelength band of the long-wavelength waviness and the wavelength band of the short-wavelength waviness is in a range of 0.25 nm to 2 nm.

8. A method as claimed in claim 1, wherein the starting material glass plate is manufactured from a glass ribbon in a predetermined high temperature state formed by pouring a glass raw material onto molten tin.

9. A method as claimed in claim 1, wherein a polishing amount in said surface polishing is in a range of 1 μm to 75 μm from the at least one surface of the starting material glass plate.

10. A method as claimed in claim 9, wherein the polishing amount in said surface polishing is in a range of ham to 25 μm from the at least one surface of the starting material glass plate.

11. A method as claimed in claim 1, wherein the ultra-fine abrasive grains used in said surface polishing contain at least one substance selected from the group consisting of cerium oxide, aluminum oxide, zirconium oxide, silicon oxide and manganese oxide.

12. A method as claimed in claim 11, wherein the ultra-fine abrasive grains used in said surface polishing comprise cerium oxide.

13. A method as claimed in claim 2, wherein a mean grain diameter of the first predetermined grain diameter is not more than 1.3 μm, and a 90% diameter of a volume grain size distribution thereof is not more than 3.5 μm.

14. A method as claimed in claim 2, wherein a mean grain diameter of the first predetermined grain diameter is not less than 0.01 μm, and a 90% diameter of a volume grain size distribution thereof is not less than 0.02 μm.

15. A method as claimed in claim 3, wherein a mean grain diameter of the predetermined grain diameter is not less than 0.01 μm, and a 90% diameter of a volume grain size distribution thereof is not less than 0.02 μm.

16. A method as claimed in claim 13, wherein a mean grain diameter of the first predetermined grain diameter is not less than 0.01 μm, and a 90% diameter of a volume grain size distribution thereof is not less than 0.02 μm.

17. A method as claimed in claim 2, wherein the long-wavelength waviness is formed to not less than 0.4 nm.

18. A method as claimed in claim 2, wherein the starting material glass plate is formed such that a short-wavelength waviness for which the wavelength band is lowest is in a range of 0.1 nm to 0.7 nm, and a medium-wavelength waviness for which the wavelength band is intermediate between the wavelength band of the long-wavelength waviness and the wavelength band of the short-wavelength waviness is in a range of 0.25 nm to 2 nm.

19. A method as claimed in claim 6, wherein the starting material glass plate is formed such that a short-wavelength waviness for which the wavelength band is lowest is in a range of 0.1 nm to 0.6 nm, and a medium-wavelength waviness for which the wavelength band is intermediate between the wavelength band of the long-wavelength waviness and the wavelength band of the short-wavelength waviness is in a range of 0.25 nm to 2 nm.

20. A method as claimed in claim 2, wherein the starting material glass plate is manufactured from a glass ribbon in a predetermined high temperature state formed by pouring a glass raw material onto molten tin.

21. A method as claimed in claim 2, wherein a polishing amount in said surface polishing is in a range of 1 μm to 75 μm from the at least one surface of the starting material glass plate.

22. A method as claimed in claim 21, wherein the polishing amount in said surface polishing is in a range of 1 μm to 25 μm from the at least one surface of the starting material glass plate.

23. A method as claimed in claim 2, wherein the ultra-fine abrasive grains used in said surface polishing contain at least one substance selected from the group consisting of cerium oxide, aluminum oxide, zirconium oxide, silicon oxide and manganese oxide.

24. A method as claimed in claim 23, wherein the ultra-fine abrasive grains used in said surface polishing comprise cerium oxide.

* * * * *

UNITED STATES PATENT AND TRADEMARK OFFICE
CERTIFICATE OF CORRECTION

| | | |
|---|---|---|
| PATENT NO. | : 7,065,984 B2 | Page 1 of 1 |
| APPLICATION NO. | : 10/300383 | |
| DATED | : June 27, 2006 | |
| INVENTOR(S) | : Masamichi Kezuka et al. | |

It is certified that error appears in the above-identified patent and that said Letters Patent is hereby corrected as shown below:

On the Title page:

Under Item (75) Inventors, the third Inventor's first name;

Change "Kensuki" to --Kensuke--.

Signed and Sealed this
Fifteenth Day of February, 2011

David J. Kappos
*Director of the United States Patent and Trademark Office*